3,626,625
MEANS AND METHOD FOR STRIPPING PURSE RINGS ON A PURSING LINE BEING HAULED IN
Morris L. Whaley, 4140 The Hill Road, Bonita, Calif. 92002
Filed Sept. 5, 1969, Ser. No. 855,578
Int. Cl. A01k 73/12
U.S. Cl. 43—4.5                10 Claims

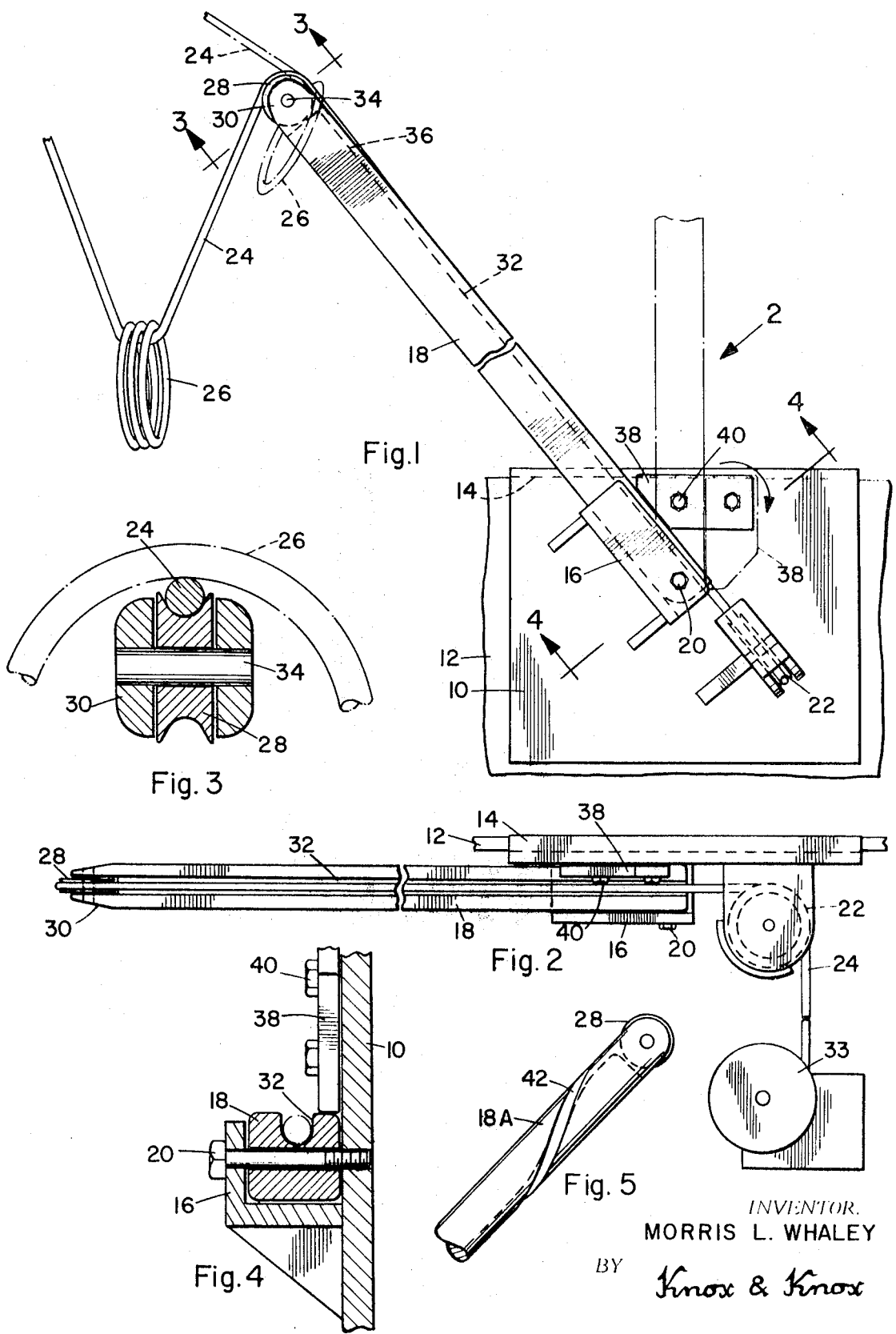

ABSTRACT OF THE DISCLOSURE

Rings on a pursing cable of a purse seine fishing net are stripped or collected on a prong, that portion of the cable with the rings thereon being made to carry the rings over the tip end of the prong and to traverse the prong. Since the cable moves relative to the prong a sheave is provided in the tip end of the prong to minimize abrasion of the cable and a cable-receiving channel in the prong is gently curved or rectilinear to facilitate the threading of heavy cable into the channel.

BACKGROUND OF THE INVENTION

The present invention relates to fishing apparatus of the purse seine type and specifically to a purse ring stripper and the method of use.

In the conventional purse seining operation, a long wall net is laid in a loop around a school of fish and the ends brought together at the boat. The upper edge of the net is supported by floats and the lower edge is weighted, so that the net hangs vertically in the water. Attached to the lower edge are spaced rings, usually 60 to 80 on a net, through which is threaded a pursing line. When the pursing line is hauled in, the bottom edge of the net is drawn inwardly or pursed to trap the fish. The pursing operation is continued until the purse rings are pulled onto the deck of the boat, where they are collected and usually secured in groups to avoid tangling and possible slippage which could allow the net to open. Since the rings are heavy and wet and are attached to a net loaded with fish, while the boat may be in continuous motion, the ring securing operation is difficult and requires considerable skill and physical effort.

A purse ring stripper has been developed and used wherein a channeled prong is employed to strip, or rather to collect, the rings but this prior art is concerned primarily with a system in which that part of the cable in the prong may remain fixed while the other "end" of the cable is hauled in. Heavier, larger sized cables, some up to seven-eighths inch in diameter, have to be accommodated.

SUMMARY OF THE INVENTION

The improvement in the method described herein is concerned with the desirability of being able to haul in either *or both* sides of the pursing line, or otherwise noted, either *or both* "ends" of the pursing cable and this means that the cable must traverse the prong without undue abrasion of the cable. The hauling in of cable through the prong becomes a step in this new method and the winch means connected to the end of the cable remote from the tip of the prong becomes an element in the combination of units required to implement the invention. A sheave in the tip end and another on the mounting plate for the prong reduce friction and abrasion to the point where it is feasible to have the cable traverse the prong. In its simplest form ease of cable introduction is best effected by a straight channel in the upper face of the prong, and the prong is made shiftable to an out-of-the-way position.

THE DRAWING

FIG. 1 is a side elevation of stripper apparatus with a fragmentary portion of a boat, the prong being indicated fragmentarily in chain lines in out-of-the-way position and a pursing line or cable illustrated fragmentarily in a position thereof ordinarily assumed when the rings are being transferred to the prong, the bridles and net being omitted as unnecessary for an understanding of the invention.

FIG. 2 is a view of the structure in FIG. 1, viewed from the direction of arrow 2 in FIG. 1;

FIG. 3 is an enlarged cross-section taken on line 3—3 in FIG. 1;

FIG. 4 is an enlarged cross-section taken on line 4—4 in FIG. 1; and

FIG. 5 is a fragmentary view of the tip end of a modified form of prong.

DESCRIPTION OF THE PREFERRED EMBODIMENT

A purse seine net used by commercial fishermen has a plurality of metal rings attached by bridles to the lower edge of the net. A pursing line or cable is strung through these rings with the ends in winches on board ship. When first deployed the net hangs vertically, supported by floats and the net is closed for the catch by hauling in the pursing line to close the bottom of the net. The rings must be collected and held on deck. This invention relates to collecting and temporarily holding the rings in proper sequential order with maximum safety and expedition.

A mounting plate 10 represents a convenient manner of attachment to a boat by bolts or welding, ordinarily to a bulwark fragmentarily shown at 12. The plate 10 has a flange 14 which rests on the top of the bulwark. A cradle 16 integral with the plate 10 supports the channeled prong 18 in an operative, inclined position, being pivotally attached by a pivot bolt 20. A pulley 22 is mounted by a bracket on plate 10 in line with the channeled prong 18. The flange 14 may function as a stop for the rings 26 collected on the prong 18.

In the method described herein a pursing line or cable 24, with rings 26 thereon, is led over a sheave 28 in the tip end 30 of the prong, along the channel 32 over the pulley 22 and to a winch 33. The winch, is per se prior art but it is important to note that the winch hauls in cable 24 so that the cable traverses the prong and carries the rings 26 over the sheave 28 onto the prong 18. The sheave 28 prevents undue abrasion of the cable 24, ordinarily a twisted, multiwire cable, and even when this cable is large and heavy it is reasonably easy to thread the same onto the sheave 28 and through the channel 32. As illustrated in FIG. 1, this channel is rectilinear and superficially exposed when the prong is in inclined operative position, thus facilitating threading.

The tip end 30 is tapered and rounded and the sheave 28 is positioned by its spindle 34 so that the cable 24 projects exteriorly of the tip end and carries the rings 26 over the sheave without scraping on the tip end 30 as illustrated in FIG. 3. The channel 32 adjacent the sheave 28 is shallow as at 36 to make the cable project slightly to further urge the rings onto the prong.

The lock bar 38 is pivoted on the plate 10 and locked in place by suitable means such as a lock bolt 40. The prong may be shifted to an out-of-the-way position as, for example, against the lock bar in an inoperative position indicated in dash line.

A modification of the prong 18A is shown in FIG. 5. In this form the sheave 28 leads to a spiral channel 42 which curves spirally from the top face of the prong tip, when in operative position, to a run-out on the underside of the prong. In this form the pulley 22 may be repositioned slightly to align with said run-out.

From the foregoing it will be clear that this apparatus and method provides safe orderly retention of the rings, minimum abrasion of the cable, with maximum expedition and ease in engaging the cable in the channel of the prong, while also permitting the desirable traversing of the prong by the cable to carry the rings onto, the prong.

What is claimed as new is:

1. In purse seining with a fishing boat and a net pursed by hauling in a pursing line or cable threaded in a loop through bridle-attached rings on the lower edge of the net, the improved method of collecting and holding the rings, comprising:

threading the cable onto an inclined channeled prong on the boat so that the cable extends along the prong substantially longitudinally, and;

hauling in the cable so that the cable moves toward and down the prong and so that the rings ride the cable over the tip end of the prong and fall and fall by gravity onto the prong to be safely held thereon in proper order and ready for being again stripped off in the reverse order.

2. A purse seine net ring stripper for use with a moving pursing cable carrying rings, said stripper comprising, in combination:

a free standing prong having mounting means at the lower end for attachment to a fishing boat;

a sheave operatively mounted in the tip end of said prong;

a cable-receiving channel in and extending along said prong and leading to said sheave;

winch means to haul in and pay out said cable through said channel and sheave;

said sheave and prong being small enough for the rings to slide over said sheave onto said prong when said winch means is operated and said sheave minimizing abrasion of the cable.

3. A ring stripper according to claim 2 wherein said channel is substantially straight for further minimization of abrasion of the cable and ease of threading the cable into the channel.

4. A ring stripper according to claim 2 wherein said channel is of spiral form adjacent said tip end of the prong, being on the upper face of the prong near said tip end and said spiral leading to the underside of the prong and the remainder of the channel being on the underside of the prong.

5. A ring stripper according to claim 2 wherein said mounting means includes a substantially vertical mounting plate having a flange at the upper edge to rest on the top of the bulwark of a fishing boat and said plate depending inboard from said flange, said plate pivotally supporting said prong so that said prong is shiftable selectively into operative position and an out-of-the-way position, and said flange being positioned close to one edge of the prong to function as a stop for the rings.

6. A ring stripper according to claim 2 and including a pulley operatively mounted adjacent the lower end of the prong remote from said tip end and aligned with said channel.

7. A ring stripper according to claim 2 wherein said mounting means includes a substantially vertical mounting plate securable to a boat, said prong being mounted on said plate, said channel having a run-out at the lower end of said prong, and a pulley mounted on said plate and aligned with said run-out of said channel when the prong is in operative position.

8. A ring stripper according to claim 7 wherein said prong is pivotally mounted on said plate and shiftable selectively to an operative inclined position and an out-of-the-way substantially vertical position, with means to hold said prong in said positions.

9. A ring stripper according to claim 2 wherein said sheave is positioned in said prong so that said cable in traversing the tip end of the prong projects exteriorly of said tip end and said rings ride the cable onto said prong.

10. A stripper according to claim 2 wherein said channel has a depth dimension less than the diameter of the cable in that part of the channel adjacent to the tip of the prong thus causing said cable in traversing that part of the channel to project exteriorly above the prong so that said rings ride the cable along the corresponding portion of the prong.

References Cited

UNITED STATES PATENTS

| | | | |
|---|---|---|---|
| 1,390,006 | 9/1921 | Akre | 43—8 |
| 1,608,894 | 11/1926 | McGrain | 43—6.5 X |
| 3,261,122 | 7/1966 | Guicheney | 43—8 |

FOREIGN PATENTS

| | | |
|---|---|---|
| 80,962 | 11/1952 | Norway. |

WARNER H. CAMP, Primary Examiner

U.S. Cl. X.R.

43—8, 14